United States Patent [19]

Thomas, Jr. et al.

[11] Patent Number: 5,115,246
[45] Date of Patent: May 19, 1992

[54] RADAR TARGET LOCATING AND TRACKING APPARATUS USING A DUAL-INTERLEAVED PULSE TRAIN RADAR WAVEFORM

[75] Inventors: Daniel D. Thomas, Jr., Liverpool; Hugh W. Hadley; Joseph J. Len, both of Skaneateles, all of N.Y.

[73] Assignee: The United States of America as represented by the Secretary of the Air Force, Washington, D.C.

[21] Appl. No.: 661,767

[22] Filed: Feb. 27, 1991

[51] Int. Cl.⁵ .............................................. G01S 13/12
[52] U.S. Cl. ..................................... 342/195; 342/133
[58] Field of Search ................. 342/90, 133, 107, 137, 342/195

[56] References Cited

U.S. PATENT DOCUMENTS

| | | | |
|---|---|---|---|
| 3,646,588 | 2/1972 | Van Popta | 343/7.3 |
| 3,935,572 | 1/1976 | Broniwitz et al. | 343/9 |
| 4,642,641 | 2/1987 | Campbell | 342/82 |
| 4,746,922 | 5/1988 | Prenat | 342/88 |

*Primary Examiner*—Mark Hellner
*Attorney, Agent, or Firm*—William Stepanishen; Donald J. Singer

[57] ABSTRACT

A radar target locating and tracking apparatus utilizing a data processor unit to process a dual-interleaved pulse train radar waveform to provide unambiguous target location. The data processor utilizes coarse range, fine range and Doppler signals which are derived from the transmitted non-ideal waveform to resolve ambiguities in target location.

5 Claims, 4 Drawing Sheets

RADAR TARGET LOCATING AND TRACKING APPARATUS USING A DUAL-INTERLEAVED PULSE TRAIN RADAR WAVEFORM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to a tracking and locating radar apparatus and, more particularly, to a radar target location and tracking apparatus utilizing a dual-interleaved pulse train radar waveform.

The state of the art of radar target location and tracking apparatus is well represented and alleviated to some degree by the prior art apparatus and approaches which are contained in the following U.S. Patents:

U.S. Pat. No. 3,646,588 issued to Van Popta on Feb. 29, 1972;.

U.S. Pat. No. 3,935,572 issued to Broniwitz et al on Jan. 27, 1976; and

U.S. Pat. No. 4,746,922 issued to Prenat on May 24, 1988.

The Van Popta patent is directed to a device for making predictions and corrections in azimuth and a given second coordinate (particularly the range) of a target to be tracked from video signals detected by a pulse radar apparatus. In such a device a varying number of bits is written in a buffer register for each detected video signal. The number of storage elements of that register correspond with the number of increments into which the measuring range is divided. These increments are shorter than the pulse duration The contents of the register are placed in the store of a computer during each transmitter pulse interval. The real target position is obtained by selection of a group of bits from the total of bit positions as written in the store during consecutive transmitter pulse intervals and by logically processing said group of bits.

The Broniwitz et al patent discusses a pulse-doppler radar tracking system which employs four filter channels for tracking range, velocity, azimuth and elevation. Each channel is mechanized in a Kalman filter form by a stored program in a digital computer. The range channel estimates target range rate and acceleration from one of many received signal frequency spectra at multiples of the pulse repetition frequency. Once the error in the range rate estimate is within a velocity corresponding to $\lambda PRF/4$, the velocity channel is reinitialized with a correction computed velocity.

The Prenat patent describes a method of and a device for removing range ambiguity in a pulse Doppler radar and to a radar including such a device especially for missile guidance. On tracking operation at a high pulse repetition frequency the method consists in switching the repetition frequency $f_R(k)$ for each time interval $\Delta t$, over a new value $f_R(k+1)$ obtained in a circuit from the measured ambiguous range $y(k)$ and from the ambiguity number $\hat{n}(k)$, as estimated in a circuit from radar information supplied by the radar, in order to remove eclipsing, to maintain the ambiguity number constant and to estimate the range with a growing accuracy in the course of the tracking operation.

A radar system for the detection of moving targets normally employs a waveform designed so target location is available at detection. Data processing is then necessary only to associate target detections from scan to scan, smooth the detection data, and generate velocity information for each target. In short, data processing is necessary only to perform conventional tracking functions.

A radar system normally employs a waveform that consists of a single pulse train or multiple pulse trains used alternatively. The pulse trains are designed so data processing can easily yield range and angle, unambiguously specifying the target's position for each target detection. This information is passed to the data processor, which sorts the detections by target and filters the detections for each target using a standard smoothing scheme (an $\alpha$-$\beta$ or Kalman filter). This smoothing scheme has three purposes:

1. It filters measurement noise so target location can be determined more accurately.
2. It estimates the velocity of each target.
3. It uses the position and velocity estimates to predict future position, facilitating association and sorting of subsequent detections into existing target track files.

In FIG. 1, there is a block diagram of a typical prior art radar tracker apparatus which performs the functions listed above.

Most radar systems do not perform significant Doppler processing. Such processing is typically used for crude discrimination of targets of interest from slow-moving targets (ground traffic, birds) and clutter. It generally is not used for association, sorting, or filtering purposes, especially when simple $\alpha$-$\beta$ filters are used.

While the above-cited references are instructive, there still remains a need to provide a radar target locating and tracking apparatus which utilizes a non-ideal waveform to unambiguously locate targets. The present invention is intended to satisfy that need.

SUMMARY OF THE INVENTION

The present invention utilizes a dual-interleaved pulse train radar waveform to generate and track unambiguous target location by data processing a non-ideal radar waveform. The radar waveform comprises two interleaved pulse train waveform with random modulation between pulses. The waveform is such that unambiguous target location cannot generally be derived from a single detection; however, the data processing algorithm successfully overcomes this limitation by data processing signal returns over a number of target detections.

It is one object of the present invention, therefore, to provide an improved radar target locating and tracking apparatus.

It is another object of the invention to provide an improved radar target locating and tracking apparatus which utilizes a non-ideal waveform to unambiguously locate targets.

It is still another object of the invention to provide an improved radar target locating and tracking apparatus which utilizes a dual-interleaved pulse train radar waveform to generate and track unambiguous target location.

It is yet another object of the invention to provide an improved radar target locating and tracking apparatus which utilizes a dual-interleaved pulse train waveform with random modulation between pulses to locate and track unambiguous targets.

These and other advantages, objects and features of the invention will become more apparent after considering the following description taken in conjunction with the illustrative embodiment in the accompanying drawings.

DETAILED DESCRIPTION OF THE PREFERRED EMBODIMENT

Figure 1:
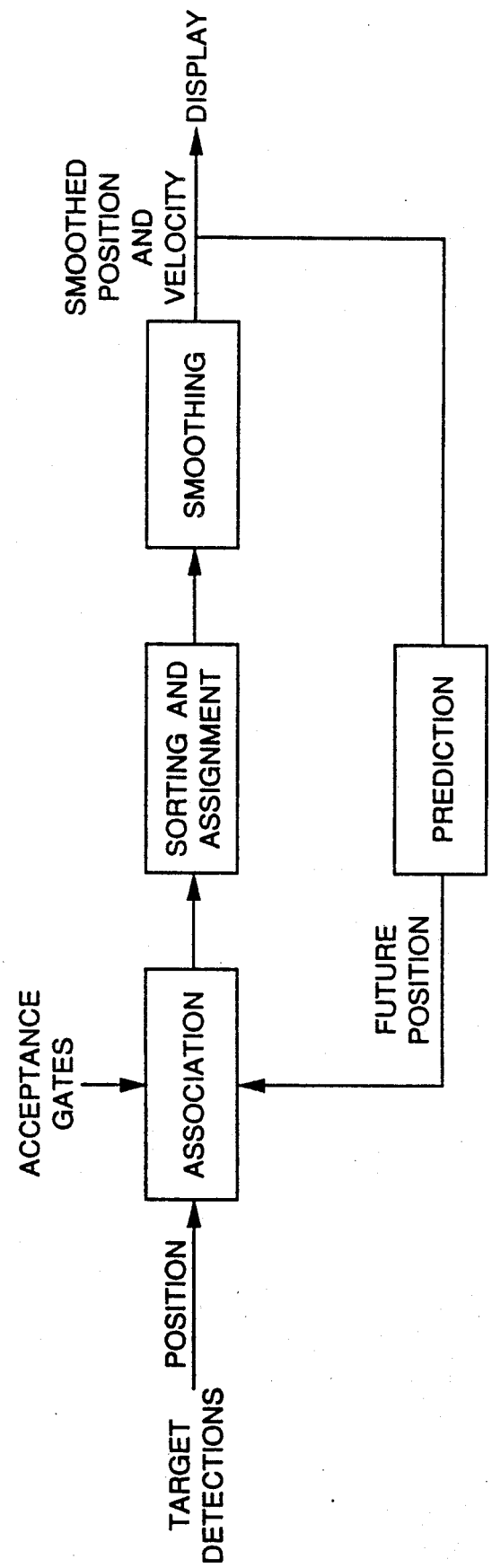
FIG. 1 is a block diagram of a prior art target tracker apparatus.
Figures 2A, 2B:
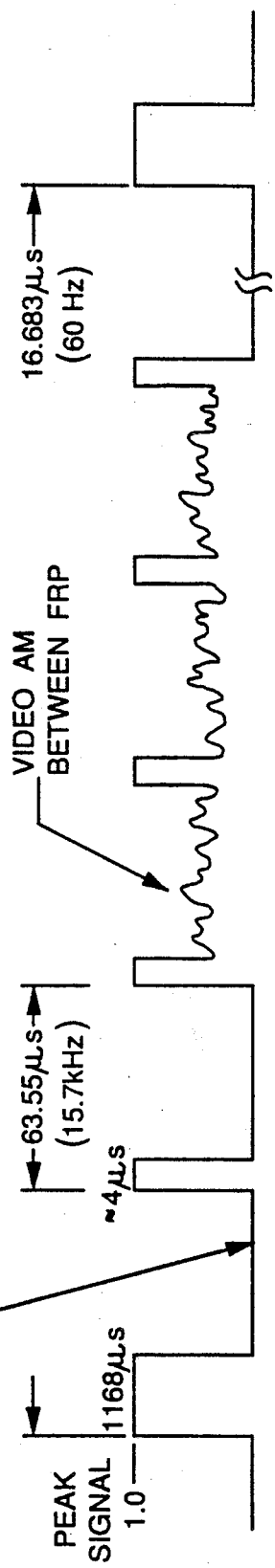
FIGS. 2a and 2b are graphical representations, respectively, of the non-ideal waveform in comparison with the typical radar waveform.

The present invention comprises a radar target locating and tracking apparatus which utilizes a data processing algorithm that extracts unambiguous target location from detection information derived from a bistatic radar employing a non-ideal waveform. There is shown in FIGS. 2a and 2b a comparison of the non-ideal waveform which is comprised of two interleaved pulse trains with random amplitude modulation between pulses and a typical radar waveform. The radar generates seven pieces of information: fine range, which is ambiguous every 19,066 meters (all ranges are bistatic) and has a resolution of 1192 meters; fine Doppler, which is ambiguous every 15,734 Hz, has a resolution of 1 meter/second (bistatic) for a one-second coherent integration period, and a carrier frequency of 600 MHz; coarse range, which is ambiguous every 5,004,900 meters and has a resolution of 87,600 meters; a coarse Doppler, which is ambiguous every 59.94 Hz and has the same resolution as fine Doppler; angle, whose resolution depends upon the receive antenna aperture; target signal amplitude; and estimated background noise level.

Data are initially sorted and tracked using fine range and Doppler. Doppler is especially important for sorting because of its good resolution. Association and assignment of detections to tracks is accomplished by first predicting the range and Doppler of each existing track. An acceptance gate in range and Doppler is placed around each predicted position (gate size is a function of false alarm rate, target dynamics, and measurement error), and all detections for a coherent integration period are checked to see if they fall within any of the acceptance gates. For those detections that do fall within an acceptance gate, a normalized error measure is calculated.

$$E = \frac{(R_m - R_p)^2}{\sigma_R^2} + \frac{(D_m - D_p)^2}{\sigma_D^2}$$

where: $R_m$, $R_p$ are the measured and predicted ranges, respectively $D_m$, $D_p$ are the measured and predicted Dopplers, respectively $\sigma_R$, $\sigma_D$ are the range and Doppler resolutions, respectively After all combinations have been examined, the detection-track matrix of errors is processed. The smallest error is chosen, and the corresponding detection is assigned to the corresponding track for filtering. The detection and track are then eliminated from further consideration. This process is choosing the smallest error, assigning detection to track, then filtering is repeated until there are no further possible matches remaining.

Figure 3:
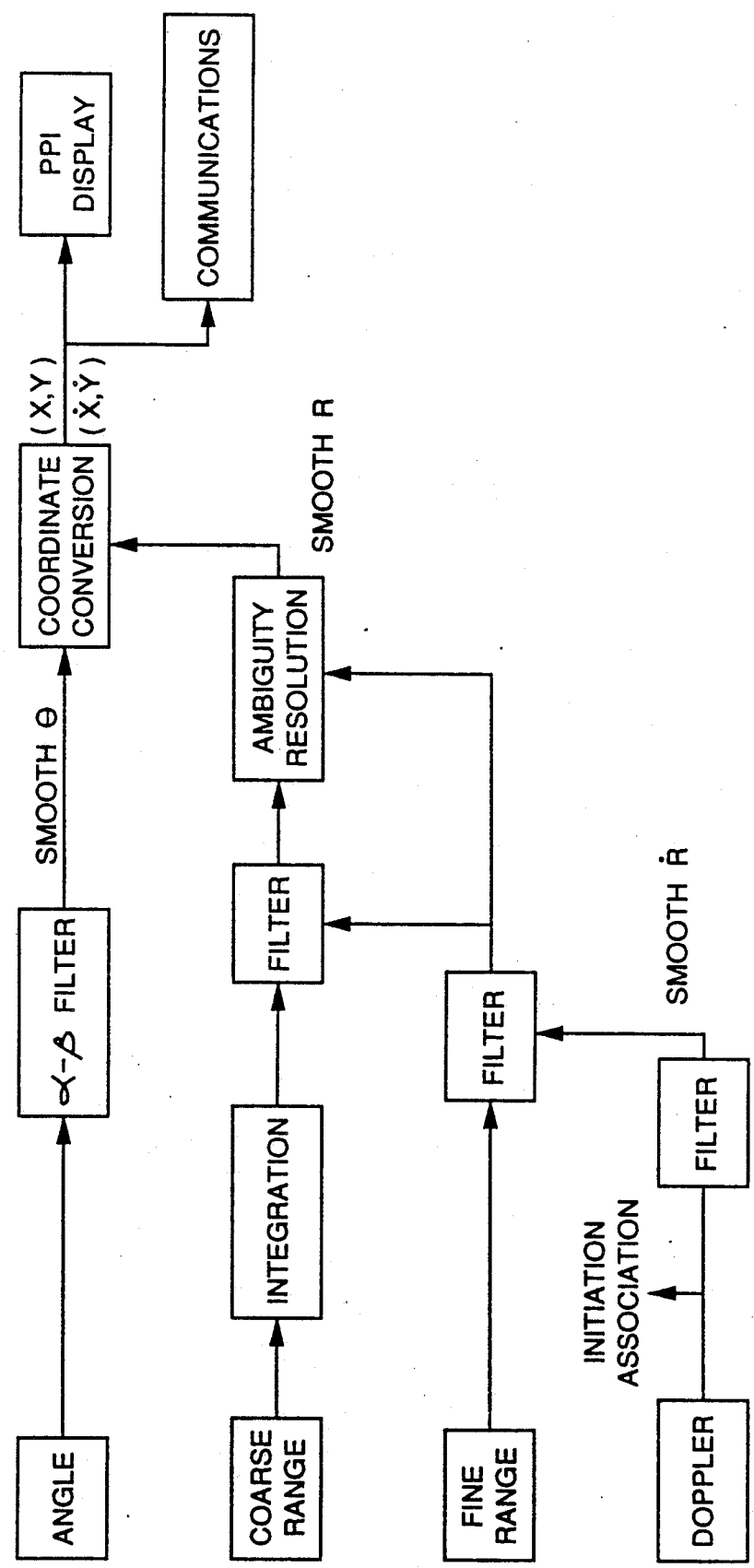
FIG. 3 is a block diagram of the data processor unit of the radar target locating and tracking apparatus, and, FIG. 4 is a flow diagram for processing coarse range data.

Filtering is very simple for all quantities except coarse range. A block diagram of filter interrelationships is shown in FIG. 3. Doppler is filtered with a simple $\alpha$-$\beta$ filter with fixed parameters. Fine range is filtered with only a first-order filter. This is possible because range rate already exists in the form of Doppler. Thus, Doppler (scaled to range rate) is used directly in the fine range filter. Angle is also filtered with an $\alpha$-$\beta$ filter with decreasing coefficients during track initiation, due to the heavier filtering typically applied to angle.

Coarse range requires very special processing. First, coarse range does not have nearly enough resolution to resolve the range ambiguity of fine range. Second, for low signal-to-noise ratios, it is difficult to reliably identify the coarse range pulse in range from the background. This can lead to totally erroneous coarse range results being passed to the filter. To solve these problems, the radar provides the value out of the coarse range processor for each of the coarse range gates to the data processor. The data processor can sort the detections based on fine range and Doppler. Having sorted them into target tracks, the data processor non-coherently integrates the coarse range gate values. This is done in as optimum a manner as possible by using the signal-to-noise ratio of each detection and a running estimate of the accuracy of the sum. Each range gate is summed as follows:

$$CRG_N = (1-\mu)CRG_O + \mu CRG_M$$

where $CRG_N$, $CRG_O$, and $CRG_\mu$ are new integrated, old integrated, and measured coarse range gate values, respectively, and $\mu$ is the integration constant. It is calculated as follows:

$$\mu = \sigma_I^2/(\sigma_I^2 + \sigma_\mu^2)$$

where $\sigma_I$ and $\sigma_\mu$ are the integrated and measured rms error estimates, respectively, of coarse range.

$$\sigma_M^2 = \sigma_{CR}^2/\sqrt{SNR}$$

where $\sigma_{CR}$ is the coarse range resolution.

$$\sigma_N^2 = (1-\mu)^2\sigma_I^2 + \mu^2\sigma_\mu^2$$

where $\sigma_N$ is the new integrated rms error estimate.

When the variance of the integrated results becomes small enough, the integrated range gate values are sent to an interpolator that is matched to the coarse range pulses and calculates the coarse range.

Figure 4:
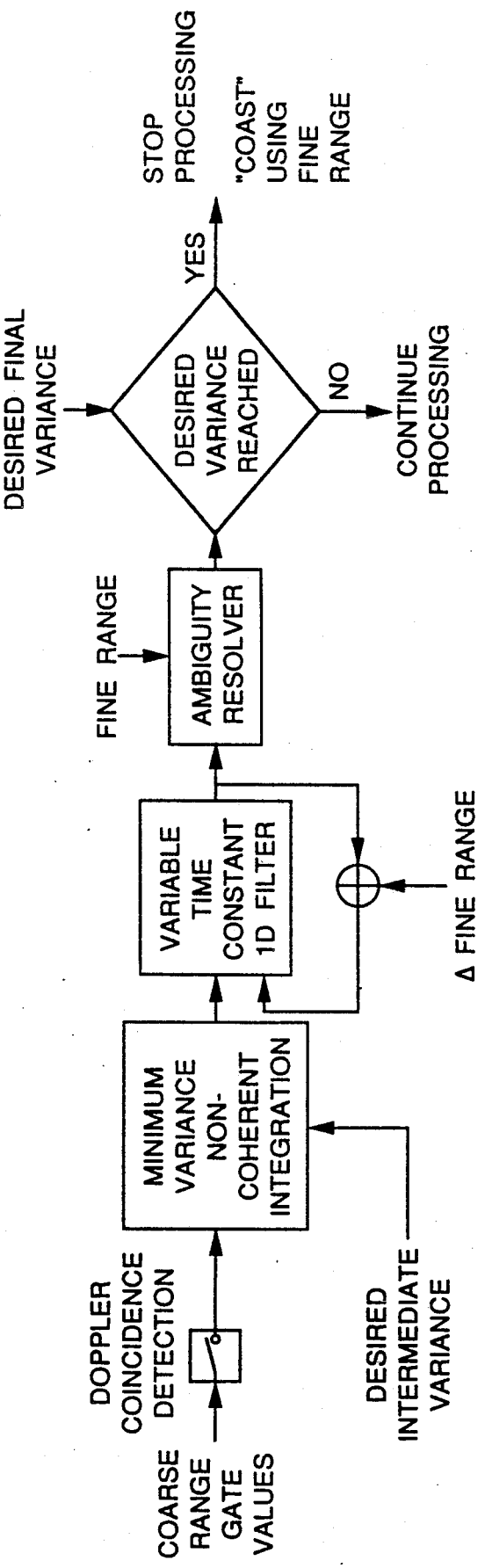

These coarse range values are then filtered with a first-order filter. Range rate information is provided by the fine range-Doppler filters. The filter coefficient is a function of input and smoothed rms error estimates similar to $\mu$ above. Eventually, the estimate error diminishes to the point where the correct ambiguous value of fine range can be chosen, which then locates the target unambiguously with high confidence. A block diagram of coarse range processing is found in FIG. 4.

Coarse Doppler is used only to inhibit some of the coarse range data from further processing. If two targets have the same coarse Doppler, the coarse range information for both targets becomes jumbled. In such cases, the coarse range is not integrated for either target.

Although the invention has been described with reference to a particular embodiment, it will be understood to those skilled in the art that the invention is capable of a variety of alternative embodiments within the spirit and scope of the appended claims.

What is claimed is:

1. A radar target locating and tracking apparatus comprising in combination:

means for transmitting a radar signal, said transmitting means transmitting a non-ideal radar waveform, means for receiving a radar return signal, said radar return signal containing target locating data including Doppler signals, means for filtering Doppler signale, said Doppler filter means extracting range rate from said Doppler signals, means for filtering fine range signals, said fine range filter means receiving said range rate from said Doppler filtering means, said fine range filtering means filtering said fine range signals and said range rate to provide a fine range signal, means for filtering coarse range signals, said coarse range filtering means including integration means which integrates said coarse range signals prior to filtering in said coarse range filtering means, said coarse range filtering means receives said fine range signal and said coarse range signal to provide an estimated fine range signal, means for ambiguity resolution, said ambiguity resolution means receiving said estimated fine range signal and said fine range signal and resolving the ambiguity therebetween to provide a corrected fine range signal, means for filtering angle signals, said angle filtering means filtering angle signals to provide a smoothed angle signal, means for coordinate conversion receiving said smoothed angle signals and said corrected fine range signal, said coordinate conversion means providing target display coordinates, and, a ppi display means receiving said target display coordinates, said ppi display means providing a display of target locations.

2. A radar target locating and tracking apparatus comprising in combination:

means for transmitting a radar signal, said transmitting means transmitting a non-ideal radar waveform, means for receiving a radar signal, said radar return signal containing target locating data, and, means for processing data, said data processing means receiving said target locating data, said data processing means initially sorting said target locating data to utilize fine range and Doppler for target resolution, said data processing means then using coarse range which is derived from said target locating data to resolve target ambiguities and to identify targets to establish target tracks, said data processing means processing angle data derived from said target locating data, said data processing means performing coordinates conversion of said angle data and said target tracks to provide a ppi display of target location wherein said non-ideal radar waveform comprises a dual-interleaved pulse train radar waveform, and wherein said dual-interleaved pulse train radar waveform comprises a coarse pulse train waveform which includes a fine range pulse train waveform positioned between adjacent coarse range pulses and further includes video signals which occurs between adjacent fine range pulses.

3. A radar target locating and tracking apparatus as described in claim 2 wherein said coarse range pulses occur at a frequency of 60 Hz.

4. A radar target locating and tracking apparatus as described in claim 2 wherein said fine range pulses occur at a frequency of 15.7 kHz.

5. A radar target locating and tracking apparatus as described in claim 2 wherein said video signals are amplitude modulated.

* * * * *